United States Patent
Lee et al.

(10) Patent No.: US 11,800,484 B2
(45) Date of Patent: Oct. 24, 2023

(54) USER EQUIPMENT (UE) POSITIONING

(71) Applicant: Telefonaktiebolaget LM Ericsson (publ), Stockholm (SE)

(72) Inventors: Woonghee Lee, Seoul (KR); Jingya Li, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 298 days.

(21) Appl. No.: 17/102,902

(22) Filed: Nov. 24, 2020

(65) Prior Publication Data

US 2022/0167303 A1 May 26, 2022

(51) Int. Cl.
| | |
|---|---|
| *H04W 64/00* | (2009.01) |
| *G01S 5/02* | (2010.01) |
| *B64C 39/02* | (2023.01) |

(52) U.S. Cl.
CPC ......... *H04W 64/006* (2013.01); *B64C 39/024* (2013.01); *G01S 5/0249* (2020.05); *G01S 5/0284* (2013.01)

(58) Field of Classification Search
CPC .. H04W 64/006; G01S 5/0249; G01S 5/0284; B64C 39/024
See application file for complete search history.

(56) References Cited

U.S. PATENT DOCUMENTS

| | | | |
|---|---|---|---|
| 6,694,142 B1 * | 2/2004 | Kuwahara | G01S 5/14 |
| | | | 701/472 |
| 9,239,369 B2 | 1/2016 | Chen et al. | |
| 10,551,479 B1 | 2/2020 | Ylamurto et al. | |
| 10,575,275 B2 | 2/2020 | Ylamurto et al. | |
| 2005/0135319 A1 * | 6/2005 | Shi | G01S 5/0289 |
| | | | 370/349 |
| 2009/0140926 A1 | 6/2009 | Traster | |
| 2013/0342396 A1 * | 12/2013 | O'Connor | G01S 19/05 |
| | | | 342/357.42 |

FOREIGN PATENT DOCUMENTS

| | | | | |
|---|---|---|---|---|
| CN | 107211300 A | * | 9/2017 | ............. H04L 41/14 |
| CN | 108337638 A | | 7/2018 | |
| WO | 2019/245234 A1 | | 12/2019 | |
| WO | WO-2020003896 A1 | * | 1/2020 | ............... G01S 5/06 |
| WO | 2020/085961 A1 | | 4/2020 | |

OTHER PUBLICATIONS

International Search Report and Written Opinion issued in International Application No. PCT/EP2021/080422 dated Aug. 8, 2022 (19 pages).

* cited by examiner

*Primary Examiner* — Khai M Nguyen
(74) *Attorney, Agent, or Firm* — Rothwell, Figg, Ernst & Manbeck, P.C.

(57) ABSTRACT

A method for estimating the location of a target user equipment (UE) using a positioning system comprising a set of N positioning reference nodes (PRNs). The method includes determining, from the set of N PRNs, a particular subset of PRNs that minimizes or maximizes an objective function, wherein the objective function is a function that is adapted to map information about a given subset of the N PRNs to an error value indicating a positioning error of the target UE. The method also includes using the determined particular subset of PRNs to estimate the location of the target UE.

15 Claims, 9 Drawing Sheets

USER EQUIPMENT (UE) POSITIONING

TECHNICAL FIELD

This disclosure relates to positioning systems and methods for estimating a position of a user equipment (UE) (a.k.a., the "target UE").

BACKGROUND

1. Third Generation Partnership Project (3GPP) Positioning

Positioning has been a topic in Long Term Evolution (LTE) standardization since 3GPP Release 9. The primary objective is to fulfill regulatory requirements for emergency call positioning. Positioning in New Radio (NR) has been enhanced to support more use cases such as highly accurate positioning for first responders, factory devices, moving vehicles, etc. FIG. 1 illustrates the NR positioning system 100, which includes location management function (LMF).

In the legacy LTE standards, the following positioning techniques are supported: (1) enhanced cell ID; (2) assisted Global Navigation Satellite System (GNSS); (3) observed time-difference-of-arrival (OTDOA) (4) uplink time-difference-of-arrival (UTDOA); and (5) positioning sensors. Enhanced Cell ID uses cell ID information to associate the target UE to the serving area of a serving cell, and then additional information may be used to determine a finer granularity position. With OTDOA, the target UE estimates the time difference of reference signals from different base stations and sends this time difference information to the Enhanced Serving Mobile Location Center (E-SMLC) for multilateration. With UTDOA the target UE is requested to transmit a specific waveform (e.g., reference signal) that is detected by multiple positioning reference nodes (PRNs) (e.g. base stations or other UEs) at known positions and then these measurements are forwarded to the E-SMLC for multilateration.

The NR positioning for release 16 is based on the 3GPP NR radio-technology and is uniquely positioned to provide added value in terms of enhanced location capabilities. The operation in low and high frequency bands (e.g., below and above 6 GHz) and utilization of massive antenna arrays provide additional degrees of freedom to substantially improve the positioning accuracy. The possibility to use wide signal bandwidth in low and especially in high bands brings new performance bounds for user location for well-known positioning techniques based on OTDOA and UTDOA, Cell-ID or E-Cell-ID etc., utilizing timing measurements to locate the target UE. The recent advances in massive antenna systems (massive MIMO) can provide additional degrees of freedom to enable a more accurate user location estimation by exploiting spatial and angular domains of the propagation channel in combination with time measurements.

2. 3GPP Network Node Relaying

3GPP LTE and 3GPP NR both support network node relaying. Network node relaying is a feature that enables signals to be relayed by network relay nodes to provide additional coverage and performance without the need to install backhaul capabilities normally required for base stations.

In NR, network node relaying is referred to as Integrated Access and Backhaul (IAB). FIG. 2 shows an example of IAB relaying, where an IAB donor node provides wireless backhaul connectivity to an IAB child node, which in turn provides access to the UEs connected to it. The IAB donor node hosts the central unit (CU) functionality while the IAB child node hosts the distributed unit (DU) functionality without the CU functionality. The IAB child node with the DU is responsible for providing wireless access to the UEs and hosts the physical layer (PHY), media access control (MAC) layer, and the radio link control (RLC) layers. While the IAB donor node with the CU is responsible for the Packet Data Convergence protocol (PDCP) and Radio Resource Control (RRC) protocol. The Mobile Termination (MT) provides the physical interface for the backhaul link between the IAB child node and the IAB donor node. NR supports multi-hope IAB relaying. IAB can be operated in both in-band (backhaul and access share the same frequency band) and out-of-band (backhaul and access use different frequency bands) modes.

If an IAB child node is placed such that the channel conditions between an IAB child node and an IAB donor node and the IAB child node and the UEs being served are much more favourable than the channel conditions between the IAB donor and the UEs, then the IAB solution enables significant coverage extension and positioning enhancements. IAB can play an important role in public safety communications, where it can be used to provide mission-critical services in regions that have poor or no existing network coverage, such as some rural locations and indoor locations.

To readily extend the network connectivity and enhance the positioning accuracy using the IAB solution, an IAB child node can be expected to be carried by a vehicle (e.g., an aerial vehicle, such as an unmanned aerial vehicle (UAV)), potentially making the IAB child node portable or mobile.

3 Device to Device (D2D) Communications

Sidelink (SL) based communication functionalities specified in 3GPP can support direct device-to-device (D2D) communications between two UEs with/without the network control. SL measurements based on the direct link between two UEs is another positioning approach that can be considered when the users are in partial network coverage or out of network coverage situations.

SUMMARY

Certain challenges presently exist. For example, estimating the position of a target UE often requires obtaining distance measurements, which are typically calculated based on measurements of reference signals transmitted to or from a positioning reference node (PRN), and the error in the distance measurements (e.g., the derived distance between the target UE and a PRN) is often significant due to factors such as non-line-of-sight (NLoS) scenarios, hardware impairments, etc. Accordingly, using such distance measurements to estimate the position of the target UE may provide an inaccurate estimate of the target UE's position.

In some scenarios some of the available PRNs are mobile (e.g., a base station carried on UAV or other vehicle, a smartphone, etc.), and this provides the opportunity to relocate these mobile PRNs to positions that will improve the target UE positioning performance by reducing the error in the distance measurements. Positioning performance can also be improved by using only a subset of the available PRNs (non-mobile PRNs and mobile PRNs) to estimate the position of the target UE. Hence, to improve target UE positioning, it would be beneficial to determine the optimal subset of the available PRNs and/or to determine the optimal position for the mobile PRNs so as to adaptively cope with the error of measurements through the relocation of PRNs to the determined optimal positions.

Accordingly, in one aspect there is provided a method for estimating the location of a target user equipment (UE) using a positioning system comprising a set of N positioning reference nodes (PRNs). The method includes determining, from the set of N PRNs, a particular subset of PRNs that minimizes or maximizes an objective function, wherein the objective function is a function that is adapted to map information about a given subset of the N PRNs to an error value indicating a positioning error of the target UE. The method also includes using the determined particular subset of PRNs to estimate the location of the target UE.

In another aspect there is provided a method for moving a set of positioning reference nodes (PRNs), the set of PRNs including a first PRN. The method includes, for the first PRN, determining a first set of candidate positions to which the first PRN can move and, for each candidate position included in the first set of candidate positions, evaluating an objective function using the candidate position, the position of each other PRN included in the set of PRNs, and the position of a target UE to produce an error value indicating a positioning error of the target UE for the candidate position. The method also includes, based on the produced error values, selecting a candidate position from the set of candidate positions. The method further includes triggering the first PRN to move to selected candidate position.

In another aspect there is provided a computer program product. The computer program product includes a non-transitory computer readable medium. The non-transitory computer readable medium stores a computer program comprising instructions which when executed by processing circuitry cause the processing circuitry to perform any process disclosed herein.

In another aspect there is provided a network entity. The network entity includes a memory processing circuitry coupled to the memory. The network entity is configured to perform any one of the processes disclosed herein.

Advantages

For fixed PRN based positioning (e.g., positioning of a target UE using fixed base stations deployed in a planned network) the proposed solutions can improve the positioning performance by selecting only the useful measurement data to use for position estimation.

For mobile PRN based positioning (e.g., positioning of a target UE using gNB or IAB node carried on UAV) the proposed solutions can improve the positioning performance by selecting only the useful measurement data to use for position estimation and by designing the best location place (e.g., a moving path including both directing and distance) for (re)locating a selected subset of the PRNs.

BRIEF DESCRIPTION OF THE DRAWINGS

The accompanying drawings, which are incorporated herein and form part of the specification, illustrate various embodiments.

DETAILED DESCRIPTION

The following examples illustrate a UE positioning system that employs a set of mobile PRNs, but it should be noted that the proposed methods are generic and can be applied for many other use cases. In the following description, a method for selecting an optimal subset of PRNs for use in estimating the position of a target UE (a.k.a., "positioning" the target UE) is described. Also described is a method for determining the optimal location for each of the PRNs included in the optimal subset. Once an optimal location is determined for a given one of the PRNs, the PRN can be moved to that location, thereby further minimize the positioning errors.

In the embodiments disclosed, an objective function is used when estimating a target UE's position using a positioning system that includes a set of N PRNs. In one embodiment, the objective function is defined based on the low rank property of a Euclidean Distance Matrix (EDM) formed by the distance measurements among the PRNs and the target UE. The objective function can be used to select the optimal subset of the N PRNs (e.g., P of the N PRNs, were P<N) that will improve the positioning performance. That is, only the measurements associated to the subset of PRNs are used for deriving the positioning of the target UE. In one embodiment, the subset of reference nodes is selected by minimizing the objective function. The objective function can also be used for adjusting the locations of a set of mobile PRNs to minimize the positioning error. In one embodiment, the local adjustment strategy is determined by minimizing the objective function. When applicable, the PRN selection method and the mobile PRN location adjustment method can be combined to further improve the positioning performance.

As used herein the term target user equipment (UE) refers to any device (e.g., mobile phone, tablet, laptop computer, sensor, appliance, vehicle, etc.), that can wirelessly communicate with a PRN. Likewise, a PRN is any device (e.g., base station, access point, UE, IAB node, etc.) that can wirelessly communicate with a target UE.

Figure 1:
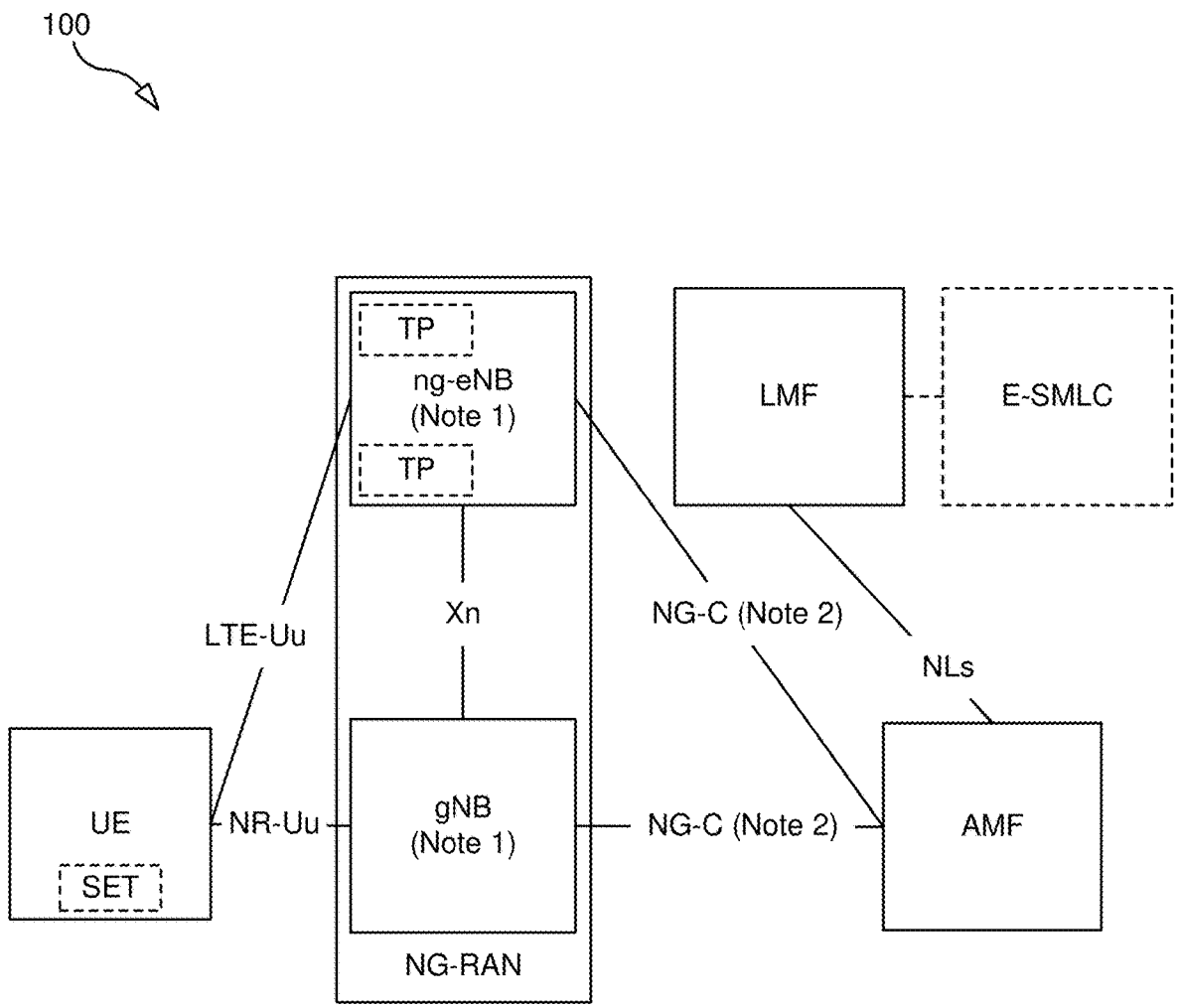
FIG. 1 illustrates the NR positioning system.
Figure 2:
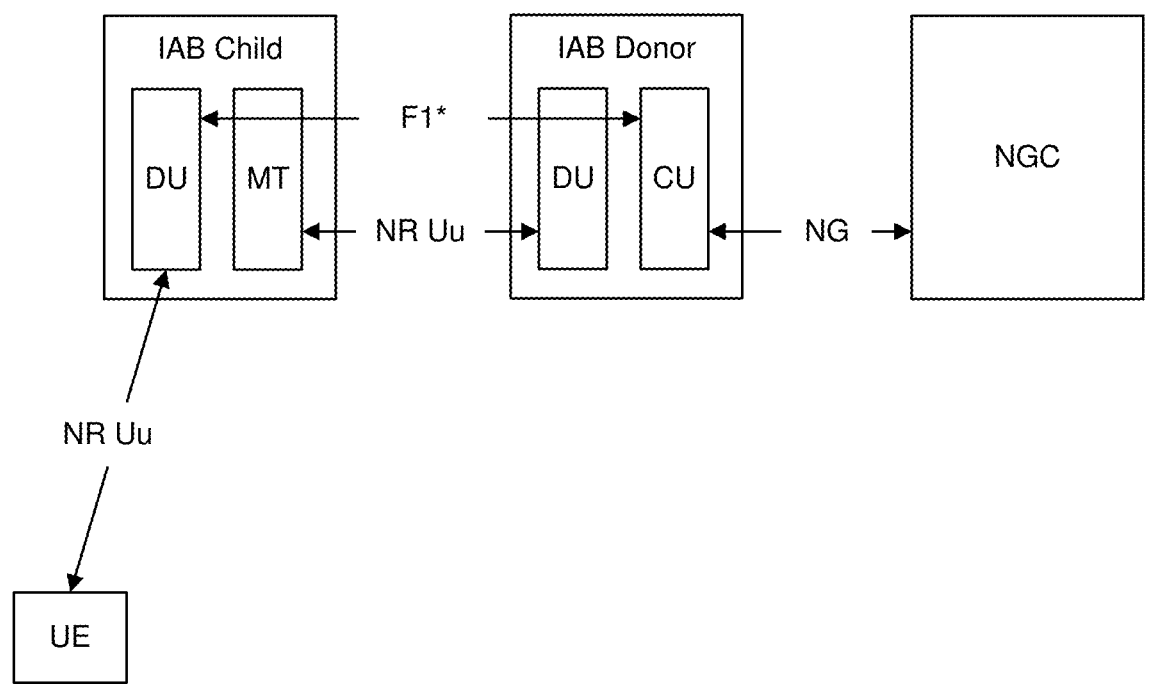
FIG. 2 shows an example of IAB relaying.
Figure 3:
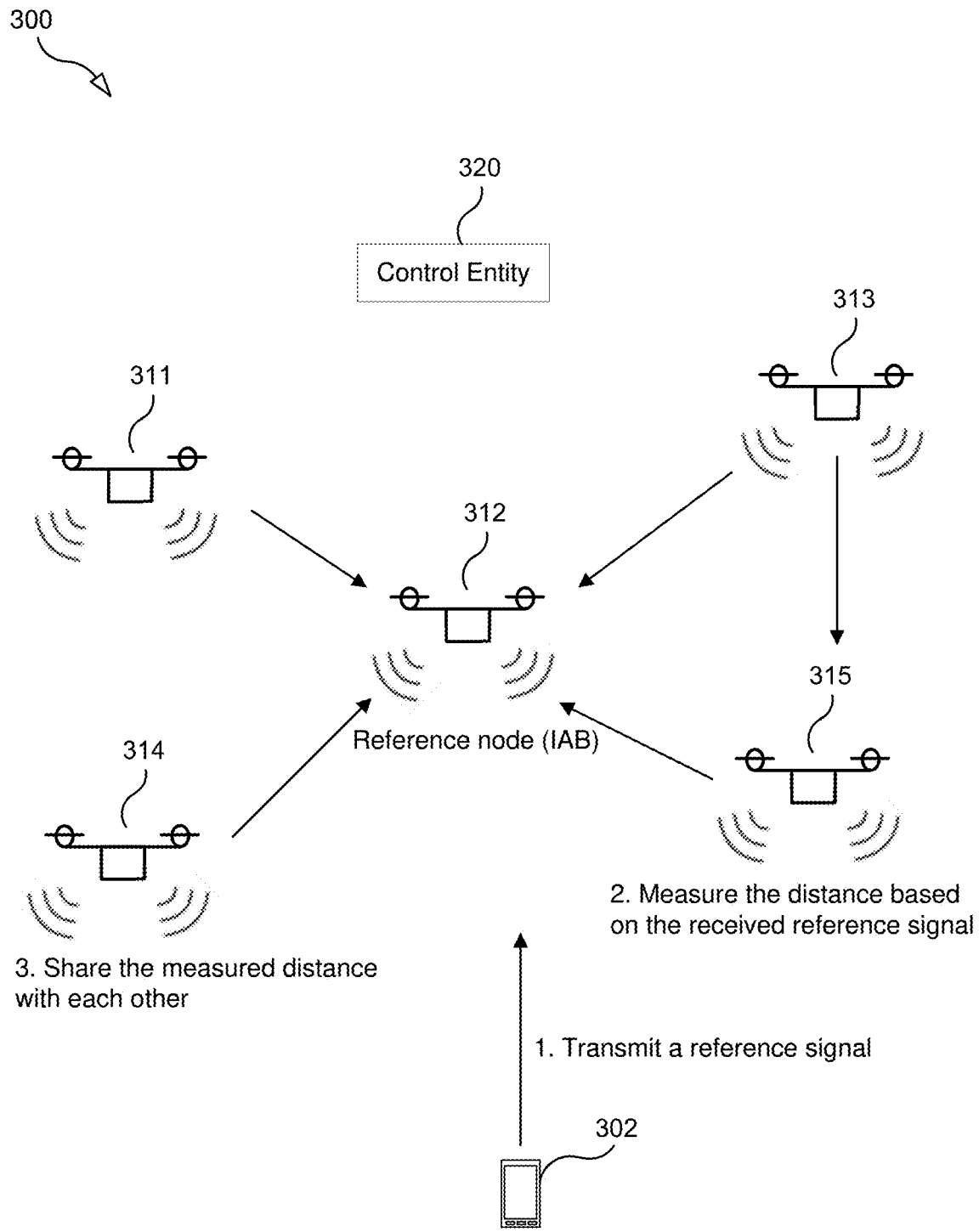
FIG. 3 shows a positioning system 300 according to an embodiment.
Figure 4:
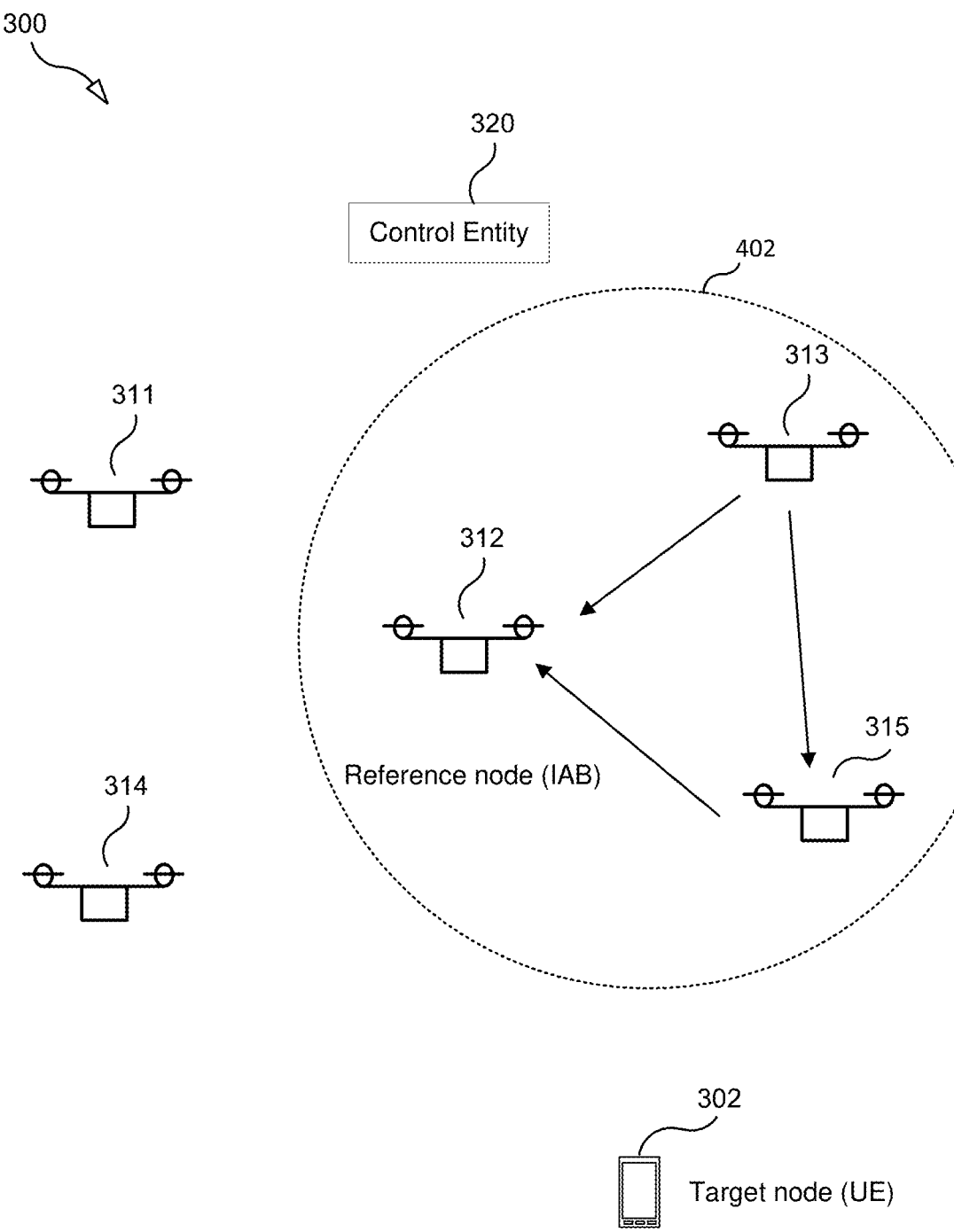
FIG. 4 shows selection of an optimal subset of PRNs.
Figure 5:
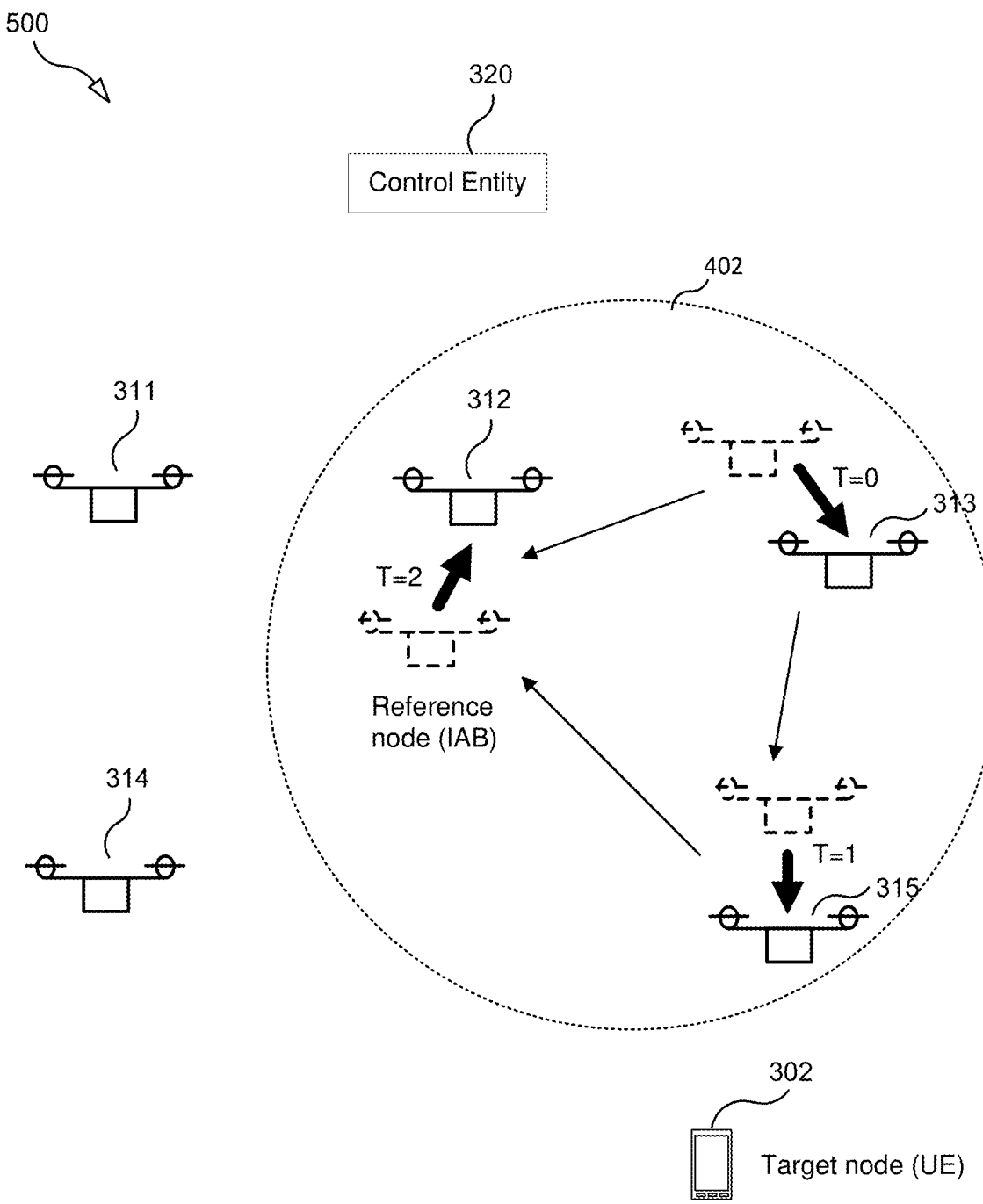
FIG. 5. shows movement of PRNs.

FIG. 3 shows a positioning system 300 according to an embodiment. Positioning system 300 includes a set of available PRNs (i.e., PRN 311, PRN 312, PRN 313, PRN 314, and PRN 315) that can be used to estimate the location of a target UE 302. In this embodiments, at least one of the PRNs (in this case PRN 311) is able to communicate with a control entity 320 (e.g., an LMF, an IAB donor, a base station, a drone control and command center, a UE). As discussed above, an objective is to i) select the best PRNs from the set of available PRNs (FIG. 4 illustrates an example of an optimal subset 402 of PRNs) and/or to move one or more of the PRNs to a better location (as illustrated in FIG. 5).

The following notation will be used to explain the processes disclosed herein.

Ω: The set of available PRNs for use in positioning the target UE.
N: The number of available PRNs.
$x_i$: The coordinates of the position of the i-th PRN in set Ω, i.e. $x_1, \ldots, x_N$ represent the coordinates of the positions of the N PRNs in set Ω

$x_{N+1}$ represents the coordinates of the position of the target UE.

E: Euclidean distance matrix formed by the distance measurements among the N+1 nodes in the system (including N PRNs and the target UE), i.e. $E(i, j)$ $(=|x_i-x_j+e_{i,j}|^2)$ for all pairs of node i and node j in the system, where $e_{i,j}$ is the error of the distance measurement between node i and j, with $1 \leq i, j \leq N+1$.

R: The vector consisting of measured distances between the N PRNs in set $\Omega$ and the target UE, i.e. $R=[|x_1-x_{N+1}+e_{1,N+1}|, \ldots, |x_N-x_{N+1}+e_{N,N+1}|]^T$.

g: the function for constructing E by inputting the positions of the N PRNs and the pairwise distances between these PRNs and the target UE, i.e. $E=g(x_1, \ldots, x_N, R)$.

$\Lambda$ $(=\{\lambda_1, \ldots, \lambda_{N+1}\})$: The set of the descending ordered eigenvalues of E.

D: the number of dimensions.

$\Omega_P$: A set of P PRNs from the set $\Omega$, where $D+2 \leq P \leq N$.

$x_p$: The coordinates of position of the p-th PRN in $\Omega_P$, where $1 \leq p \leq P$.

$R_P$: The vector consisting of measured distances between the P PRNs in set $\Omega_P$ and the target UE.

$E_P$: The partial E consisting of the P PRNs in set $\Omega_P$ and the target UE.

$\Omega_P^*$: The optimal set of P PRNs selected from the set $\Omega$.

$\Gamma(=\{\Theta, \Phi, \Psi\})$: The three-dimensional movement strategy set. Here, $\Theta, \Phi, \Psi$ indicate the all possible strategies for a movement in terms of azimuth-angle, zenith-angle, and distance, respectively.

$\gamma^*(=\{\theta^*, \varphi^*, \psi^*\})$: The best strategy among all movement candidates in the strategy set $\gamma$, i.e. the optimal 3-D vector representing PRN movement.

Q: Bits for quantizing $\gamma^*$.

L: The function of PRN movement, i.e. $x_i(t+1)=L(x_i(t), \gamma^*)=x_o(t)+[\psi^*\cos\theta^*\sin\varphi^*, \psi^*\sin\theta^*\sin\varphi^*, \psi^*\cos\varphi^*]^T$ where t is a time index.

The low rank property of the Euclidean distance matrix means that, if there are N arbitrary nodes in the D-dimensional space, then the rank of the Euclidean distance matrix E consisting of the squared values of distances between the N nodes is always equal to or less than D+2. In other words, if the Euclidean distance matrix E is formed as $E(i,j)$ $(=|x_i-x_j|^2)$ for all i,j where $x_i$ and $x_j$ are the coordinates of node i and j in D-dimensional space, respectively (i.e., there is no error in distance measurements), then the rank of E is always equal to or less than D+2. If the Euclidean distance matrix is flawless, then the rank is equal to D+2, which means that $\lambda_1, \lambda_1, \ldots, \lambda_{D+2}$ are non-zero, while $\lambda_{D+3}, \ldots, \lambda_{P+1}$ are zero, where $\lambda_i$ for i=1 to P+1 is the set of the descending ordered eigenvalues of the Euclidean distance matrix for P PRNs. Accordingly, the optimal PRN subset can be selected based on a suitably designed objective function. After determining the optimal subset of PRNs, each PRN in the selected subset can move to adapt its location to minimize (or maximize) the suitably designed objective function based on low rank property of Euclidean distance matrix.

For this disclosure we assume D=3 and that the positions of the PRNs are known. In this case, based on the low rank property of the Euclidean distance matrix: Rank(E)$\leq$5 (=D+2) if $e_{i,j}$ for all i and j are zero. In practice, $|e_{i,j}| \geq 0$ is inevitable, which results in that the above property does not hold. However, one can configure the settings closest to the above properties based on the following objective function, which minimizes the portion of off-dimensional eigenvalues in all eigenvalues.

Objective Functions

A partial Euclidean distance matrix (EDM), $E_P$, can be formed for all possible subsets of size P. In one embodiments, the objective function can be defined as:

$$f(E_P) = \frac{\prod_{k=D+3}^{P+1} \lambda_k}{\prod_{k=1}^{P+1} \lambda_k}, \quad \text{(Eq. 1A)}$$

where $E_P = g(x_1, \ldots, x_P, R_P)$, and $(\lambda_1, \ldots, \lambda_{P+1})$ are the set of the descending ordered eigenvalues of $E_P$.

It means that the objective function is defined as the multiplication of the off-dimensional Eigenvalues of EDM $$\left(\prod_{k=6}^{P+1} \lambda_k\right)$$

over the multiplication of all Eigenvalues of EDM $$\left(\prod_{k=1}^{P+1} \lambda_k\right).$$

Thus, minimizing this objective function f is equivalent to maximizing on-dimensional information for positioning.

In an alternative embodiment, the objective function is defined as the multiplication of all Eigenvalues of EDM $$\left(\prod_{k=1}^{P+1} \lambda_k\right)$$

over the multiplication of the off-dimensional Eigenvalues of EDM $$\left(\prod_{k=6}^{P+1} \lambda_k\right).$$

Hence, in this embodiment the objective function can be defined as:

$$f(E_P) = \frac{\prod_{k=1}^{P+1} \lambda_k}{\prod_{k=D+3}^{P+1} \lambda_k}, \quad \text{(Eq. 1B)}$$

Thus, maximizing this objective function f is equivalent to maximizing on-dimensional information for positioning.

In an embodiment, the objective function is defined as a function of the eigenvalues of the EDM formed by the pair wise distance measurements among the reference nodes and the target UE.

Accordingly, In one embodiment, the objective function associated to a set of P reference nodes and a target UE, denoted as set $\Omega_P$, is defined as $$f(E_P) = \frac{\prod_{k=D+3}^{P+1} \lambda_k}{\prod_{k=1}^{P+1} \lambda_k},$$

where $E_P$ is the EDM formed by the distance measurements among the P+1 nodes, including the P reference nodes in set $\Omega_P$ and the target UE, i.e. $E_P$ (i, j) ($=|x_i-s_j+e_{i,j}|^2$) for all pairs of node i and node j, where $x_1, \ldots, x_P$ are the coordinates of the positioning of the P reference nodes in set $\Omega_P$, $x_{P+1}$ is the coordinates of the positioning of the target UE, and $e_{ij}$ is the error of the distance measurement between node i and j, with $1 \leq i, j \leq P+1$. E ($\lambda_1, \ldots, \lambda_{P+1}$) are the set of the descending ordered eigenvalues of $E_P$. And D is the positioning dimension, e.g., for 3-D positioning, D=3.

As an example, the EDM formed by the distance measurements among the P+1 nodes, $E_P$, can be constructed by inputting the positions of the N PRNs and the pairwise distances between these PRNs and the target UE, i.e., $E=g(x_1, \ldots, x_P)$, where $R_P$ is the vector consisting of measured distances between the P UAVs in set $\Omega_P$ and the target UE, i.e., $R_P=[|x_1-x_{P+1}e_{1,P+1}|, \ldots, |x_P-x_{P+1}+e_{P,P+1}|]^T$.

In some embodiments, the PRN selection decision is made by control entity 320. The control entity can be an LMF, an IAB donor node (e.g., when all positioning reference nodes are IAB nodes connected to the IAV donor node), a base station (e.g., a gNB or eNB when all positioning reference nodes are UEs served by the gNB/eNB), a UE (e.g., a UE that collects the global positioning measurements and make a decision based on the global information), a drone control and command center, or any combination of these.

In some embodiments, the PRN selection decision is made in a distributed fashion at each PRN in the system. The positioning measurements (e.g., distance measurements) are shared among these PRNs. Based on the shared information, each PRN makes the decision on whether it is selected for the positioning of the target UE (e.g., each PRN determines the optimal subset of PRNs and determines wither it is included in the optimal subset). Each PRN may then inform the control entity as to whether or not the PRN is included in the optimal subset. In this way, the control entity can determine the members of the optimal subset of PRN and then obtain form each PRN included in the optimal subset a distance measurement indicating a distance between the PRN and the target UE (e.g., a time of arrival measurement). The control entity can then use the distance measurements and information regarding the position of each PRN to estimate the position of the target UE using, for example, a standard multilateration approach.

PRN Selection—i.e., Determining $\Omega_P*$

In one embodiment, the optimal subset of P UAVs (illustrated in FIG. 4 as set 402) is selected from the N UVAs by minimizing Eq. 1A as follows: $\Omega_P*=\mathrm{argmin}\ f(g(x_1, \ldots, x_P, R_P))$ (Eq. 2-1A), or by maximizing Eq. 1B as follows: $\Omega_P*=\mathrm{argmax}\ f(g(x_1, \ldots, x_P, R_P))$ (Eq. 2-1B)

That is, the best PRN subset (a.k.a., $\Omega_P*$) is selected as a group of P reference nodes out from all available PRNs in the system, which minimizes (or maximizes) the value of an objective function.

In addition, one can also determine the optimal value for P (i.e. the optimal size of the for the optimal subset), P*, as follows:

$(P*, \Omega_P*) = \mathrm{argmin}\ f(g'(P, x_1, \ldots, x_P, R_P))$, or (Eq. 2-2A)

$(P*, \Omega_P*) = \mathrm{argmax}\ f(g'(P, x_1, \ldots, x_P, R_P))$, or (Eq. 2-2B)

where g' is the function of implementing the function g with the all possible P ($\geq D+2$).

The above PRN selection methods can be applied for both fixed/static PRN based positioning and mobile PRN based positioning.

In the following section, it is explained how the positioning error of the target UE can be further reduced in the case where at least some of the PRNs are mobile.

Movement Strategy (adjusting the position of one or more PRNs):

This disclosure provides a method of choosing $\gamma*(=\{\theta*, \varphi*, \psi*\})$, i.e., the best three-dimensional movement strategy for a mobile PRN to further minimize the positioning error.

After the set $\Omega_P*$ is determined, the mobile PRNs in set $\Omega_P*$ can adjust their positions to further minimize the positioning error by selecting an optimal movement strategy (defined as a 3-D vector) for each of the mobile PRNs one-by-one in a round-robin fashion as follows. First, determine $\gamma*$ for the first mobile PRN, where $\gamma*=\mathrm{argmin}\ f(g(L(x_1(t), \gamma), x_2(2), \ldots, x_P(t), R_P))$ (Eq. 3). Second, after determining $\gamma*$, first mobile PRN transmit $\gamma*$ as Q bits to the second mobile PRN. These two steps are then repeated in sequence by the 2nd mobile PRN, the 3d mobile PRN, etc. This illustrated in FIG. 5, which shows that at time T=0 PRN 313 moves to a new location and then transmits it new location to PRN 315, which then at time T=1 determines a new location, moves to the new location, and then transmits its new location to PRN 312, which then at time T=2 determines a new location and moves to the new location.

In an embodiment, the location adjustment strategy for each mobile PRN is defined as a set of parameters in terms of azimuth-angle, zenith-angle, and the distance moved from its current location. In an embodiment, a set of azimuth-angles, zenith-angles, and distance values are configured as the movement strategy candidates for the location adjustment decision making.

In an embodiment, the best location adjustment strategy for a set of PRNs is made at a control entity (e.g., a central node). In an embodiment, the best location adjustment strategy is selected as the one that minimizes the value of an objective function, which is defined as a function of the eigenvalues of the EDM formed by the pair wise distance measurements among the reference nodes and the target UE. As an example, the objective function is defined as (Eq. 1A).

In an embodiment, the location adjustment decision is made at each of the mobile PRNs one-by-one in a round-robin fashion. In an embodiment, the best location adjustment strategy at each mobile PRN is selected as the one that minimizes the value of an objective function, considering the current location information of all the other reference nodes. As an example, the objective function is defined as (Eq. 3).

In an embodiment, after a mobile PRN adjusts its location, the mobile PRN shares its updated location information to other PRNs. The location information can be shared using direct communication (e.g., sidelink communication) between the PRN and other PRNs. The location information can also be shared using uplink and downlink transmissions.

The movement strategy can be implemented after performing the PRN selection. It can also be used independently for improving the positioning performance, i.e., not necessarily be combined with the PRN section step.

Performance Analysis

Figure 6:
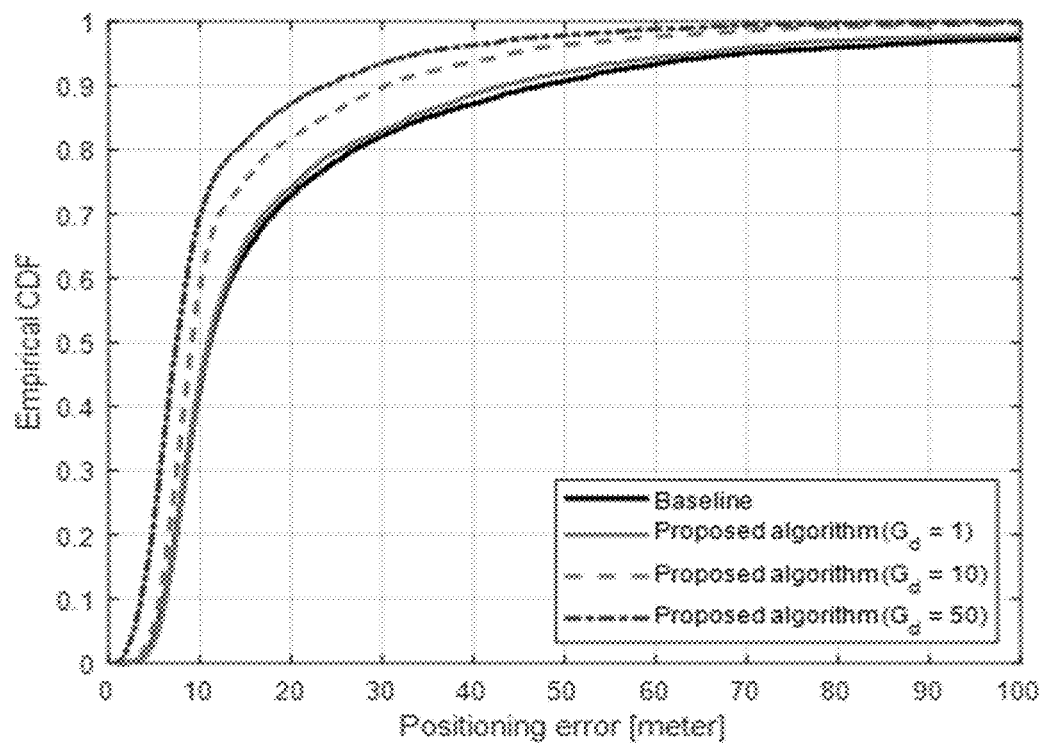
FIG. 6. illustrates experimental results.

Multidimensional scaling (MDS) based positioning is used as the baseline algorithm and FIG. 6 illustrates the experimental results. The experiment settings were as follows: i) 5000 Monte-Carlo Simulations, ii) N=8 mobile PRNs and one target UE were placed randomly in a 500× 500×500 cubic using a uniform random number generator, iii) P was set to 5; iv) the distance resolution was set to 10 for the distance measurement; and v) it was assumed that a) the ranging error dependent to signal quality follows Normal (0,1); b) the ranging error due to clock asynchronization follows Unif(0,10); c) the NLoSevent follows Ber(0.1); and d) the distance bias at the NLoS event is 25.

Algorithm for Improving Target UE Positioning

Step 1: for a set of N PRNs and one target UE, generate a (N+1)-by-(N+1) Euclidean distance matrix by distance measurements.

Step 2: Obtain $\Omega_P^*$ (e.g., minimize equation 1A by selecting the best set of P UAVs among N UAVs based on (Eq. 2-1A) or (Eq. 2-2A), or maximize equation 1B by selecting the best set of P UAVs among N UAVs based on (Eq. 2-1B) or (Eq. 2-2B).

Step 3: determining the optimum position for each mobile PRN as described above and move each mobile PRN to its optimal position.

Figure 7:
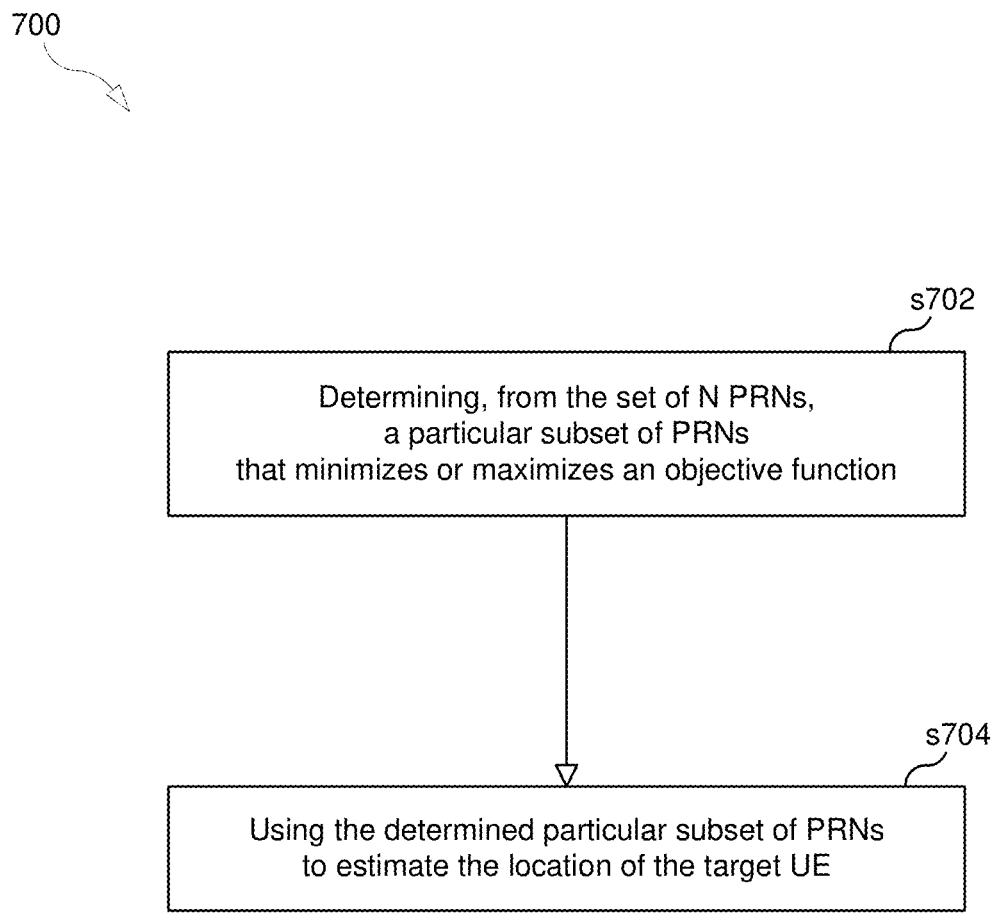
FIG. 7 is a flowchart illustrating a process according to some embodiments.

FIG. 7 is a flowchart illustrating a process 700, according to an embodiment, for estimating the location of target UE 302 using a positioning system comprising a set of N PRNs (e.g., PRNs 311-315). Process 700 may being in step s702. Step s702 comprises determining, from the set of N PRNs, a particular subset of PRNs that minimizes or maximizes an objective function, wherein the objective function is a function that is adapted to map information about a given subset of the N PRNs to an error value indicating a positioning error of the target UE. Step s704 comprises using the determined particular subset of PRNs to estimate the location of the target UE.

In some embodiments, the step of determining a particular subset of PRNs from the set of N PRNs that minimizes or maximizes the objective function comprises: 1) evaluating the objective function for a first subset of the N PRNs to produce a first error value; 2) evaluating the objective function for a second subset of the N PRNs to produce a second error value; and 3) comparing the first error value to the second error value.

In some embodiments, the step of evaluating the objective function for the first subset of the N PRNs comprises: forming a first Euclidean distance matrix based on the first subset of the N PRNs; and evaluating the objective function based on the first Euclidean distance matrix.

In some embodiments, evaluating the objective function based on the first Euclidean distance matrix comprises: determining a set of descending ordered eigenvalues of the first Euclidean distance matrix; and evaluating the objective function using the set of descending ordered eigenvalues.

In some embodiments, the set of descending ordered eigenvalues consists of the following ordered set of eigenvalues: $\lambda_1, \lambda_2, \ldots, \lambda_{P+1}$, evaluating the objective function using the set of descending ordered eigenvalues comprises calculating: X/Y or Y/X, where $$X = \prod_{k=D+3}^{P+1} \lambda_k,$$

$$Y = \prod_{k=1}^{P+1} \lambda_k,$$

D=is a geometric dimension, and P is the size of the first subset of PRNs.

In some embodiments, forming the first Euclidean distance matrix based on the first subset of the N PRNs comprises for each PRN included in the first subset, determining a distance between the PRN and each other PRN included in the first subset, and for each PRN included in the first subset, determining a distance between the PRN and the target UE.

In some embodiments, the process may further include determining an optimal subset size, P. In some embodiments, the step of determining the optimal subset size comprises: 1) for a first value of P, finding a first subset of PRNs which minimizes or maximizes the objective function, thereby generating a first error value associated with the first subset of PRNs, wherein the number of PRNs included in the first subset is the first value of P; 2) for a second value of P, finding a second subset of PRNs which minimizes or maximizes the objective function, thereby generating a second error value associated with the second subset of PRNs, wherein the number of PRNs included in the second subset is the second value of P; 3) comparing the first error value to the second error value; and 4) selecting one of the first value of P or the second value of P based on the comparison.

In some embodiments, the process may further include after determining the particular subset of PRNs: 1) obtaining information indicating a first set of possible new coordinates for a first PRN included in the particular subset of PRNs; 2) for each new coordinate for the first PRN included in the first set of possible new coordinates, determining a value of the objective function based on the new coordinate for the first PRN and the positions of each other PRN included in the particular subset; 3) based on the determined values, selecting from the first set of possible new coordinates a first new coordinate for the first PRN; and 4) moving the first PRN to the first new coordinate.

In some embodiments the process may still further include, after the first PRN moves to the first new coordinate: 1) for each new coordinate included in a second set of possible new coordinates for a second PRN included in the subset of PRNs, determining a value of the objective function based on the new coordinate for the second PRN and the positions of each other PRN included in the particular subset; 2) based on the determined values, selecting from the second set of possible new coordinates a second new coordinate for the second PRN; and 3) moving the second PRN to the second new coordinate.

In some embodiments, the process may further include a control entity determining a new location for each of PRNs included in the subset of PRNs using the objective function; and based on the determined new location, the control entity instructing each of PRNs included in the subset of PRNs to move to the determined new location.

In some embodiments, process 700 is performed by control entity 320, which may be a LMF, an IAB donor, a base station, a drone control and command center, or a UE.

In some embodiments, the step of determining the particular subset of PRNs is performed by at least a first PRN included in the set of N PRNs and a second PRN included in the set of PRNs. In some embodiments, the process further includes the first PRN determining whether it is included in the particular subset of PRNs; the first PRN transmitting to a control entity a message indicating whether or not the first PRN has determined that it is included in the particular set of PRNs; the second PRN determining whether it is included in the particular subset of PRNs; and the second PRN transmitting to the control entity a message indicating whether or not the second PRN has determined that it is included in the particular set of PRNs. In some embodiments, the control entity is configured to determine the particular subset of PRNs using the message from the first PRN and the message from the second PRN and to estimate the location of the target UE.

In some embodiments, the information about the given subset of the N PRNs comprises information derived from a distance matrix that comprises, for each PRN included in the given subset, a distance value specifying a determined distance between the PRN and the target UE.

Figure 8:
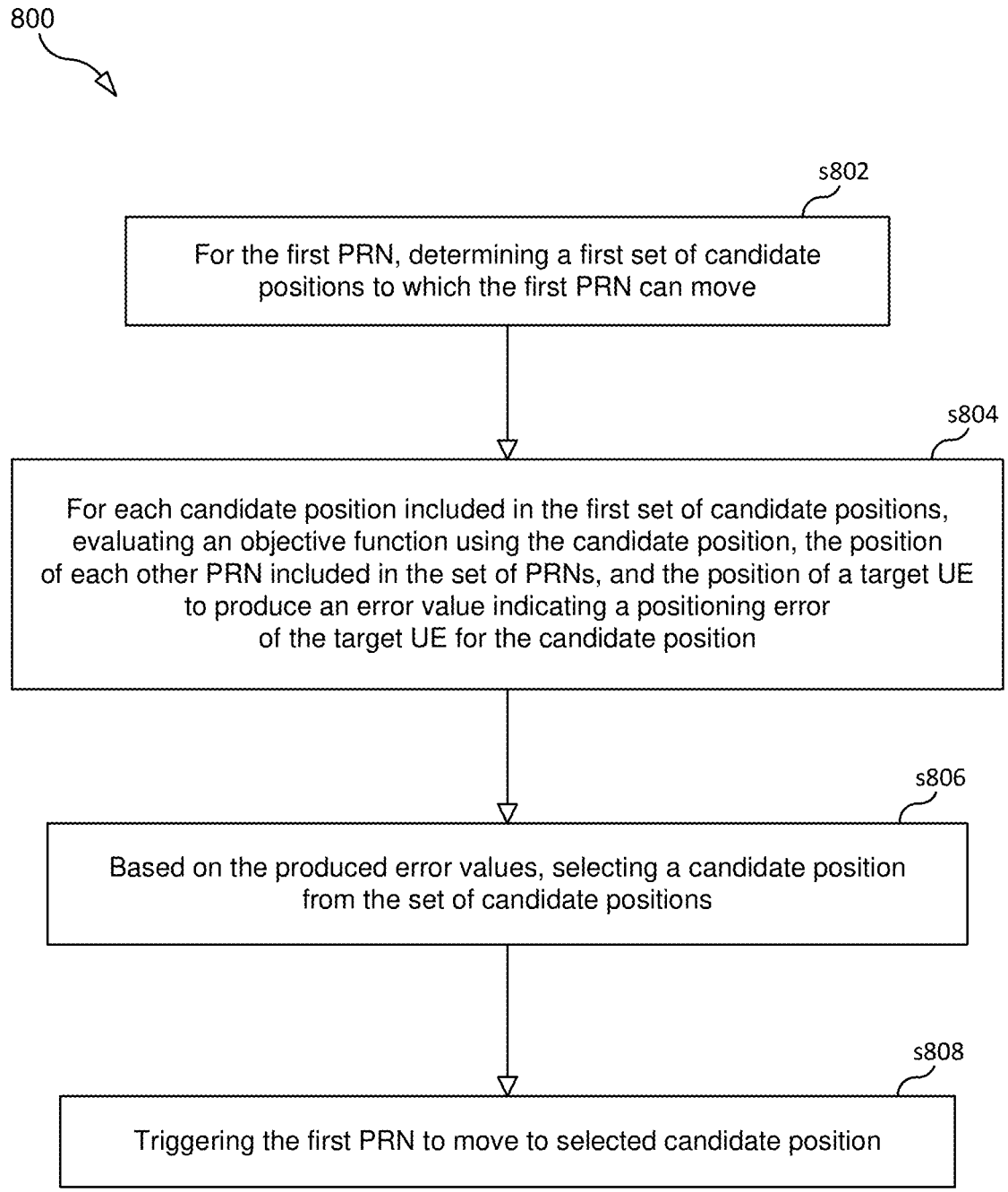
FIG. 8 is a flowchart illustrating a process according to some embodiments.

FIG. 8 is a flowchart illustrating a process 800, according to an embodiment, for moving a set of PRNs. Process 800 may being in step s802. Step s802 comprises, for a first PRN in the set of PRNs, determining a first set of candidate positions to which the first PRN can move. Step s804 comprises, for each candidate position included in the first set of candidate positions, evaluating an objective function using the candidate position, the position of each other PRN included in the set of PRNs, and the position of a target UE to produce an error value indicating a positioning error of the target UE for the candidate position. Step s806 comprises, based on the produced error values, selecting a candidate position from the set of candidate positions. Step s808 comprises triggering the first PRN to move to selected candidate position (e.g., causing a UAV that is carrying the PRN to move to the selected candidate position).

In some embodiments, the step of evaluating the objective function comprises: forming a Euclidean distance matrix based on the candidate position, the position of each other PRN included in the set of PRNs, and the position of a target UE; and evaluating the objective function based on the Euclidean distance matrix. In some embodiments, evaluating the objective function based on the Euclidean distance matrix comprises: determining a set of descending ordered eigenvalues of the Euclidean distance matrix; and evaluating the objective function using the set of descending ordered eigenvalues. In some embodiments, the set of descending ordered eigenvalues consists of the following ordered set of eigenvalues: $\lambda_1, \lambda_2, \ldots, \lambda_{P+1}$, evaluating the objective function using the set of descending ordered eigenvalues comprises calculating: X/Y or Y/X, where $$X = \prod_{k=D+3}^{P+1} \lambda_k, \quad Y = \prod_{k=1}^{P+1} \lambda_k,$$

D=is a geometric dimension, and P is the number of PRNs included in the set of PRNs. In some embodiments, forming the Euclidean distance matrix comprises: for each PRN included in the set of PRNs, determining a distance between the PRN and each other PRN included in the set of PRNs, and for each PRN included in the set of PRNs, determining a distance between the PRN and the target UE.

Figure 9:
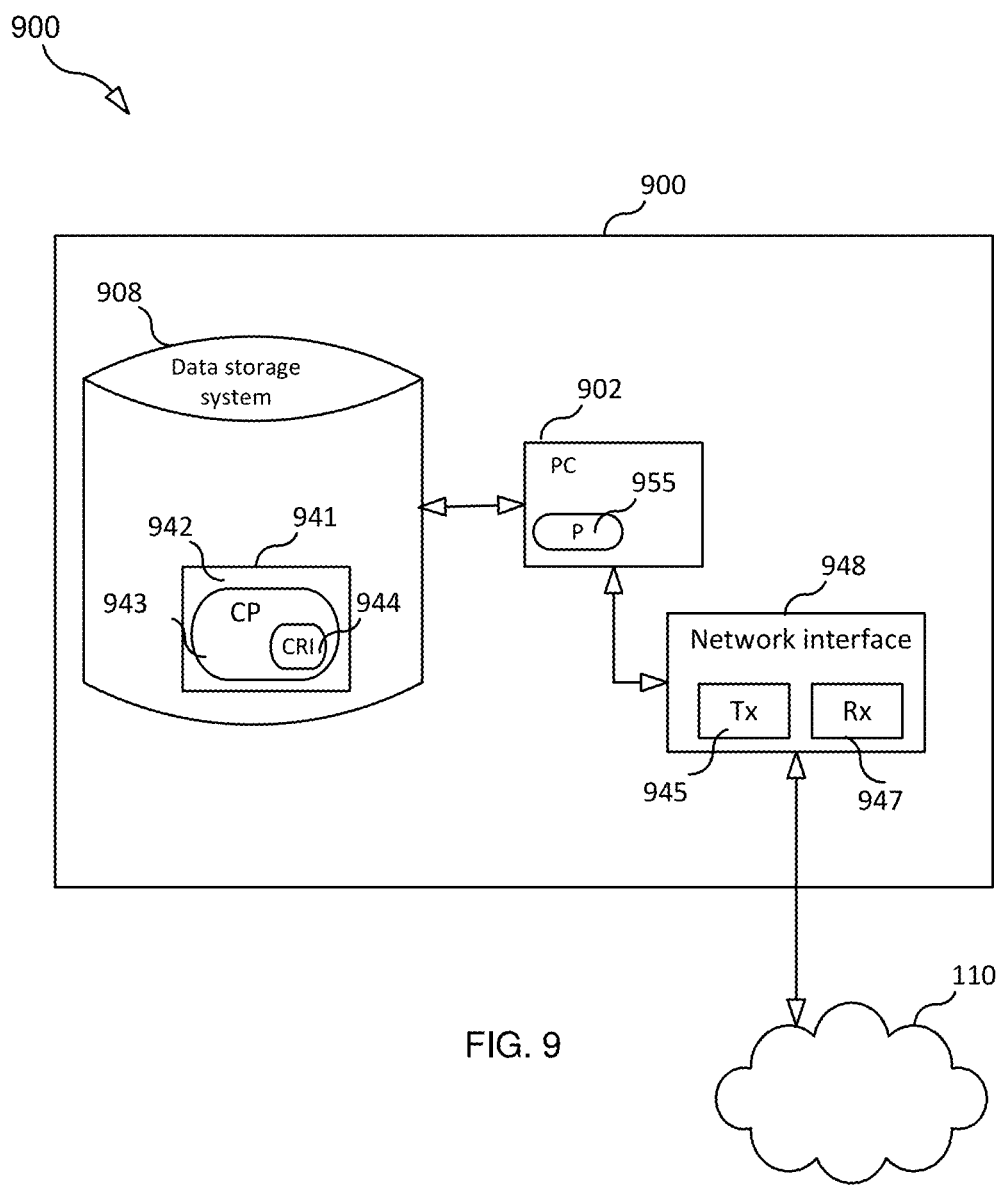
FIG. 9 block diagram of a network entity according to some embodiments.

FIG. 9 is a block diagram of a network entity 900 (e.g., control entity 320), according to some embodiments, for performing any of the method disclosed herein. As shown in FIG. 9, network entity 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 900 may be a distributed computing apparatus or part of a cloud computing system); at least one network interface 948 comprising a transmitter (Tx) 945 and a receiver (Rx) 947 for enabling network entity 900 to transmit data to and receive data from other nodes connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes network entity 900 to perform steps described herein (e.g., steps described herein with reference to the flow charts). In other embodiments, network entity 900 may be configured to perform steps described herein without the need for code. That is, for example, PC 902 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for estimating the location of a target user equipment (UE) using a positioning system comprising a set of N positioning reference nodes (PRNs), the method comprising:
    selecting, from the set of N PRNs, a subset of PRNs that minimizes or maximizes an objective function, wherein the objective function is a function that is adapted to map information about a given subset of the N PRNs to an error value indicating a positioning error of the target UE; and
    using the selected subset of PRNs to estimate the location of the target UE, wherein
    selecting the subset of PRNs that minimizes or maximizes the objective function comprises:
        evaluating the objective function for a first subset of the N PRNs to produce a first error value;
        evaluating the objective function for a second subset of the N PRNs to produce a second error value;
        comparing the first error value to the second error value; and
        based on a result of the comparing, selecting either the first subset or the second subset.

2. The method of claim 1, wherein evaluating the objective function for the first subset of the N PRNs comprises:
    forming a first Euclidean distance matrix based on the first subset of the N PRNs; and evaluating the objective function based on the first Euclidean distance matrix.

3. The method of claim 2, wherein evaluating the objective function based on the first Euclidean distance matrix comprises:
determining a set of descending ordered eigenvalues of the first Euclidean distance matrix; and
evaluating the objective function using the set of descending ordered eigenvalues.

4. The method of claim 3, wherein
the set of descending ordered eigenvalues consists of the following ordered set of eigenvalues: $\lambda_1, \lambda_2, \ldots, \lambda_{P+1}$,
evaluating the objective function using the set of descending ordered eigenvalues comprises calculating: X/Y or Y/X, where $$X = \prod_{k=D+3}^{P+1} \lambda_k,$$
$$Y = \prod_{k=1}^{P+1} \lambda_k,$$

D=is a geometric dimension, and
P is the size of the first subset of PRNs.

5. The method of claim 2, wherein forming the first Euclidean distance matrix based on the first subset of the N PRNs comprises:
for each PRN included in the first subset, determining a distance between the PRN and each other PRN included in the first subset, and
for each PRN included in the first subset, determining a distance between the PRN and for each PRN included in the first subset, determining a distance between the PRN and the target UE.

6. The method of claim 1, further comprising: determining an optimal subset size, P, by performing a process comprising:
for a first value of P, finding a first subset of PRNs which minimizes or maximizes the objective function, thereby generating a first error value associated with the first subset of PRNs, wherein the number of PRNs included in the first subset is the first value of P;
for a second value of P, finding a second subset of PRNs which minimizes or maximizes the objective function, thereby generating a second error value associated with the second subset of PRNs, wherein the number of PRNs included in the second subset is the second value of P;
comparing the first error value to the second error value; and
selecting one of the first value of P or the second value of P based on the comparison.

7. The method of claim 1, further comprising, after selecting the subset of PRNs:
obtaining information indicating a first set of possible new coordinates for a first PRN included in the selected subset of PRNs;
for each new coordinate for the first PRN included in the first set of possible new coordinates, determining a value of the objective function based on the new coordinate for the first PRN and the positions of each other PRN included in the selected subset;
based on the determined values, selecting from the first set of possible new coordinates a first new coordinate for the first PRN; and
moving the first PRN to the first new coordinate.

8. The method of claim 7, further comprising, after the first PRN moves to the first new coordinate:
for each new coordinate included in a second set of possible new coordinates for a second PRN included in the subset of PRNs, determining a value of the objective function based on the new coordinate for the second PRN and the positions of each other PRN included in the selected subset;
based on the determined values, selecting from the second set of possible new coordinates a second new coordinate for the second PRN; and
moving the second PRN to the second new coordinate.

9. The method of claim 1, further comprising:
a control entity determining a new location for each of PRNs included in the subset of PRNs using the objective function; and
based on the determined new location, the control entity instructing each of PRNs included in the subset of PRNs to move to the determined new location.

10. The method of claim 1, wherein the method is performed by a control entity, wherein the control entity is any one of: a location management function (LMF), an integrated access backhaul (IAB) donor, a base station, a drone control and command center, or a user equipment (UE).

11. The method of claim 1, wherein
the step of selecting the subset of PRNs is performed by at least a first PRN included in the set of N PRNs and a second PRN included in the set of PRNs.

12. The method of claim 11 further comprising:
the first PRN determining whether it is included in the selected subset of PRNs;
the first PRN transmitting to a control entity a message indicating whether or not the first PRN has determined that it is included in the selected set of PRNs;
the second PRN determining whether it is included in the selected subset of PRNs; and
the second PRN transmitting to the control entity a message indicating whether or not the second PRN has determined that it is included in the selected set of PRNs, wherein
the control entity is configured to i) select the subset of PRNs using the message from the first PRN and the message from the second PRN and ii) estimate the location of the target UE.

13. The method of claim 1, wherein the information about the given subset of the N PRNs comprises information derived from a distance matrix that comprises, for each PRN included in the given subset, a distance value specifying a determined distance between the PRN and the target UE.

14. A computer program product comprising a non-transitory computer readable medium storing a computer program comprising instructions which when executed by processing circuitry cause the processing circuitry to perform the method of claim 1.

15. A network entity, the network entity comprising:
a memory; and
processing circuitry coupled to the memory, wherein the network entity is configured to perform the method of claim 1.

* * * * *